US010618623B2

(12) United States Patent
Zhu

(10) Patent No.: US 10,618,623 B2
(45) Date of Patent: Apr. 14, 2020

(54) HIGH-SPEED AIRCRAFT AND AIRCRAFT HAVING GREATER LIFT

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 203 days.

(21) Appl. No.: 15/314,385

(22) PCT Filed: Nov. 16, 2015

(86) PCT No.: PCT/CN2015/094737
§ 371 (c)(1),
(2) Date: Nov. 28, 2016

(87) PCT Pub. No.: WO2016/078562
PCT Pub. Date: May 26, 2016

(65) Prior Publication Data
US 2017/0197697 A1 Jul. 13, 2017

(30) Foreign Application Priority Data
Nov. 17, 2014 (CN) .......................... 2014 1 0655137

(51) Int. Cl.
B64C 1/00 (2006.01)
B64C 3/00 (2006.01)
(Continued)

(52) U.S. Cl.
CPC .............. B64C 1/0009 (2013.01); B64C 3/00 (2013.01); B64C 21/04 (2013.01); F42B 10/42 (2013.01);
(Continued)

(58) Field of Classification Search
CPC .......... B64C 1/0009; B64C 3/14; B64C 1/00; B64C 3/00; B64C 2003/143; B64C 39/06;
(Continued)

(56) References Cited

U.S. PATENT DOCUMENTS 2,404,954 A * 7/1946 Godsey, Jr. ............... F02K 3/06
244/15
2,665,083 A * 1/1954 Custer .................... B64D 27/18
244/12.6
(Continued)

FOREIGN PATENT DOCUMENTS

CN 2122834 U 11/1992
CN 2511527 Y 9/2002
(Continued)

OTHER PUBLICATIONS

K. Weltner et al, "Misinterpretations of Bernoulli's Law"; University of Frankfurt; Frankfurt, Germany; earliest-retrieved date is in the year 2005. (Year: 2005).*
(Continued)

Primary Examiner — Bernarr E Gregory
(74) Attorney, Agent, or Firm — Ladas & Parry, LLP

(57) ABSTRACT

Disclosed in the present invention is a high-speed aircraft, comprising a shell and an engine, an outer fluid channel and an inner fluid channel being arranged in succession within the shell, the outer fluid channel and the inner fluid channel respectively connecting to the exterior by means of their own air vent; the outer fluid channel is connected to an air suction port of the engine, such that the pressure difference produced by the flow rate within the outer fluid channel being greater than the flow rate within the inner fluid channel acts as the driving force source of the aircraft. Also disclosed in the present invention is an aircraft having greater lift. The present invention provides an innovative method and apparatus for a driving force source obtained from fluid resistance, thus changing the mutual contradiction of a traditional driving apparatus directing external force to itself whilst also needing to use more driving force to overcome fluid resistance. The present invention changes the direction of fluid pressure, altering the condition that the amount of pressure
(Continued)

dictates the size of the driving force source obtained; on this basis, a novel greater first and second lift source and driving force source are produced for use in an aircraft.

1 Claim, 7 Drawing Sheets

(51) Int. Cl.
*F42B 10/66* (2006.01)
*B64C 21/04* (2006.01)
*F42B 10/42* (2006.01)
*B64C 3/14* (2006.01)
*B64C 27/06* (2006.01)
*B64C 21/00* (2006.01)

(52) U.S. Cl.
CPC ............... *F42B 10/66* (2013.01); *B64C 3/14* (2013.01); *B64C 2003/143* (2013.01)

(58) Field of Classification Search
CPC ... B64C 39/062; B64C 39/064; B64C 39/066; B64C 39/068; B64C 21/06; B64C 29/0025; B64C 21/02; B64C 21/04; B64C 27/06; F42B 10/66; F42B 10/42; B64D 27/18
USPC ........ 60/262, 761, 767, 768; 244/12.1, 12.2, 244/12.6, 21, 207–209
See application file for complete search history.

(56) References Cited

U.S. PATENT DOCUMENTS

| | | | |
|---|---|---|---|
| 2,772,058 A * | 11/1956 | Grant | B64C 21/02 244/216 |
| 2,821,351 A * | 1/1958 | Utgoff | B64D 27/18 244/15 |
| 2,885,162 A | 5/1959 | Griswold II | |
| 2,918,230 A * | 12/1959 | Lippisch | B64C 29/0025 244/23 R |
| 2,918,232 A * | 12/1959 | Lippisch | B64C 29/0025 244/23 R |
| 2,997,847 A * | 8/1961 | Lee | F02C 3/04 415/141 |
| 3,017,139 A * | 1/1962 | Binder | B64C 39/062 244/12.6 |
| 3,055,614 A | 9/1962 | Thompson | |
| 3,058,696 A * | 10/1962 | Culpepper | B64C 21/02 244/207 |
| 3,097,817 A | 7/1963 | Towzey, Jr. | |
| 3,161,018 A * | 12/1964 | Sandre | F02K 7/16 60/244 |
| 3,161,377 A | 12/1964 | Balluff | |
| 3,172,253 A * | 3/1965 | Hughes | F02K 7/16 137/15.1 |
| 3,231,038 A | 1/1966 | Weiland | |
| 3,317,162 A | 5/1967 | Grant | |
| 3,424,404 A | 1/1969 | Rea | |
| 3,465,988 A * | 9/1969 | Orr | B64C 29/0025 244/12.1 |
| 3,854,286 A * | 12/1974 | Klees | F02K 3/075 239/265.11 |
| 3,903,639 A * | 9/1975 | Howell | A63H 27/02 244/153 R |
| 3,942,320 A * | 3/1976 | Ortwerth | F02K 7/10 60/211 |
| 4,494,713 A | 1/1985 | Kim | |
| 4,500,052 A | 2/1985 | Kim | |
| 4,568,042 A | 2/1986 | Carr | |
| 4,579,300 A | 4/1986 | Carr | |
| 4,651,953 A | 3/1987 | Kim | |
| 4,666,104 A * | 5/1987 | Kelber | B64C 21/06 239/265.19 |
| 5,056,307 A * | 10/1991 | Liang | B64D 33/04 60/226.1 |
| 5,167,387 A | 12/1992 | Hartwich | |
| 5,280,827 A | 1/1994 | Taylor et al. | |
| 5,307,624 A * | 5/1994 | Even-Nur | F02K 3/075 60/226.3 |
| 5,374,010 A | 12/1994 | Stone et al. | |
| 5,538,201 A | 7/1996 | Gerhardt | |
| 5,590,520 A * | 1/1997 | Papamoschou | F02K 1/34 181/213 |
| 5,848,768 A | 12/1998 | Seyfang | |
| 6,216,982 B1 | 4/2001 | Pfennig et al. | |
| 6,607,162 B2 * | 8/2003 | Warsop | B64C 39/062 244/12.6 |
| 7,150,432 B2 | 12/2006 | Ouellette et al. | |
| 7,152,829 B2 | 12/2006 | Bertolotti | |
| 7,658,063 B1 * | 2/2010 | Matheny | F02K 3/02 60/204 |
| 8,448,892 B2 | 5/2013 | Zhu | |
| 9,109,539 B2 * | 8/2015 | Duge | F02K 3/02 |
| 2003/0192987 A1 | 10/2003 | Ahrendt et al. | |
| 2009/0065631 A1 | 3/2009 | Zha | |
| 2009/0108125 A1 | 4/2009 | Shmilovich et al. | |
| 2009/0212165 A1 | 8/2009 | Parikh | |
| 2010/0116943 A1 | 5/2010 | Meister | |
| 2010/0294893 A1 | 11/2010 | Heintze et al. | |
| 2011/0001000 A1 | 1/2011 | Zhu | |
| 2011/0006165 A1 | 1/2011 | Ireland | |
| 2011/0168843 A1 | 7/2011 | Calder | |
| 2011/0198444 A1 | 8/2011 | Dong | |
| 2012/0043428 A1 | 2/2012 | Goelling et al. | |
| 2012/0085867 A1 | 4/2012 | Bardwell | |
| 2013/0145744 A1 * | 6/2013 | Lo | F01D 17/105 60/226.3 |
| 2013/0181095 A1 * | 7/2013 | Akhmejanov | B64C 39/062 244/23 C |
| 2013/0306803 A1 | 11/2013 | Zhu | |

FOREIGN PATENT DOCUMENTS

| | | |
|---|---|---|
| CN | 2620100 Y | 6/2004 |
| CN | 1833109 A | 9/2006 |
| CN | 2868845 Y | 2/2007 |
| CN | 101195348 A | 6/2008 |
| CN | 101196203 A | 6/2008 |
| CN | 101224709 | 7/2008 |
| CN | 101224790 A | 7/2008 |
| CN | 101229822 A | 7/2008 |
| CN | 2683438 Y | 3/2009 |
| CN | 101602404 A | 12/2009 |
| CN | 101708742 A | 5/2010 |
| CN | 101941522 A | 1/2011 |
| CN | 102145744 A | 8/2011 |
| CN | 103204186 A | 7/2013 |
| CN | 103600844 A | 2/2014 |
| CN | 104386236 A | 3/2015 |
| CN | 104386237 A | 3/2015 |
| DE | 10041970 A1 | 3/2002 |
| JP | 2003-083227 A | 3/2003 |
| RU | 2088872 C1 | 8/1997 |
| WO | 2007055088 A1 | 5/2007 |

OTHER PUBLICATIONS

P. Eastwell, "Bernoulli? Perhaps, but What About Viscosity?", "The Science Education Review"; vol. 6, issue 1; printed in the year 2007; pp. 1-13. (Year: 2007).*
International Search Report for PCT/CN2015/094737 dated Feb. 29, 2016 and its English translation provided by WIPO.
Written Opinion of the International Search Authority f for PCT/CN2015/094737 dated Feb. 29, 2016 and its English translation provided by Google Translate.
From CN104386236A, First Office Action dated Nov. 27, 2015, and its English translation from Bing Translator.
From CN104386236A, Second Office Action dated Jul. 5, 2016, and its English translation from Bing Translator.

(56) References Cited

OTHER PUBLICATIONS

From CN104386236A, Third Office Action dated Oct. 31, 2016, and its English translation from Bing Translator.
From CN104386236A, Search Report and its English translation from Bing Translator.
From CN104386237A, First Office Action dated Nov. 27, 2015, and its English translation from Bing Translator.
From CN104386237A, Second Office Action dated Aug. 1, 2016, and its English translation from Bing Translator.
From CN104386237A, Search Report and its English translation from Bing Translator.
From CN103204186A, First Office Action dated Jan. 7, 2015, and its English translation from Bing Translator.
From CN103204186A, Second Office Action dated Jun. 19, 2015, and its English translation from Bing Translator.
From CN103204186A, Third Office Action dated Oct. 27, 2015, and its English translation from Bing Translator.
From CN103204186A, Search Report and its English translation from Bing Translator.
From CN101602404A, Search Report and its English translation from Bing Translator.
From CN101229822 A, Search Report and its English translation from Bing Translator.
From CN101708742 A, Search Report and its English translation from Bing Translator.
PCT International Preliminary Report on Patentability (Chapter I) with Written Opinion from PCT/CN2015/094737 dated May 23, 2017 and its English translation from WIPO.
English translation from WIPO for PCT International Written Opinion from PCT/CN2015/094737 dated Feb. 29, 2016.
Office Action from Chinese Application No. 201210013844.0 (also published as CN103204186) dated Jan. 7, 2015 with its English translation and partial English translation of search report.
Office Action from Chinese Application No. 201410655137.0 (also published as CN104386236A) dated Feb. 9, 2018, and its English translation.
Office Action from Chinese Application No. 201410655137.0 (also published as CN104386236A) dated Aug. 29, 2017, and its English translation.
Office Action from Chinese Application No. 201410655137.0 (also published as CN104386236A) dated Nov. 27, 2015 with its English translation and partial English translation of search report.
Office Action from Chinese Application No. 201410655140.2 (also published as CN104386237A) dated Feb. 9, 2018 and its English translation.
Office Action from Chinese Application No. 201410655140.2 (also published as CN104386237A) dated Aug. 29, 2017, and its English translation.
Office Action from Chinese Application No. 201410655140.2 (also published as CN104386237A) dated Nov. 28, 2016 and its English translation.
Office Action from Chinese Application No. 201410655140.2 (also published as CN104386237A) dated Nov. 27, 2015 with its English translation and partial English translation of search report.

\* cited by examiner

HIGH-SPEED AIRCRAFT AND AIRCRAFT HAVING GREATER LIFT

CROSS-REFERENCE TO RELATED APPLICATIONS

The present application is the U.S. national phase of PCT Application No. PCT/CN2015/094737 filed on Nov. 16, 2015, which claims the priority of the Chinese patent application No. 201410655137.0 filed on Nov. 17, 2014, which are incorporated herein by reference in their entireties.

TECHNICAL FIELD

The present disclosure relates to aircrafts, particularly to high-speed aircrafts and aircrafts having greater lift.

BACKGROUND ART

Aircrafts have been around for over a hundred years. Lift source of a fixed-wing aircraft may only come from wings. However, due to a small difference between an upper arc surface and a lower planar surface of the wings, a small difference of flow velocity may be generated therebetween, producing small pressure difference, thus resulting in small lift.

Since the Industrial Revolution happened over 200 years ago, a basic theory generating source of impetus and a structure of a conventional moving device have never been changed. So far, there are no efficient theories, methods and devices to overcome fluid resistance. For an available moving device including an aircraft, about 90% of impetus is applied to overcome fluid resistance, leaving only 10% or less on driving the device itself. Such low energy utilization efficiency has seriously affected the development of aircrafts.

Methods and apparatuses for generating source of greater lift from interior thereof have been proposed in the present inventor's patents, such as Chinese invention Patent Application No. 200810065334.1 [Publication No. CN101229822 (A)] entitled "Moving device", Chinese invention Patent Application No. 200910105982.X [Publication No. CN101708742 (A)] entitled "Fluid movement device", U.S. patent application Ser. No. 13/864,370 (Publication No. US 2013306803) entitled "Aircraft Generating a Lift from an Interior Thereof", filed Apr. 17, 2013, now U.S. Pat. Nos. 8,910,903; and 8,448,892B2 entitled "Aircraft Generating a Lift from an Interior Thereof".

On the basis of years of research, the inventor found that, by means of making a flow velocity of an inner fluid layer faster than a flow velocity of an outer fluid layer where the inner and the outer fluid layers are formed internally and externally around a shell of a moving device, about 90% impetus is applied to overcome the fluid resistance just like the conventional moving device; and on the contrary, a new source of greater impetus would be obtain; then on this basis, the inventor further found that a first and a second lift sources may be generated from the inner and outer fluid layers by the aircraft, thus producing an aircraft having a larger impetus and a greater lift.

SUMMARY OF THE INVENTION

Starting from the impetus source which is the most fundamental and core problem, the present inventor have discovered that, counterforce for driving a conventional moving device may not include gross impetus, and source of larger impetus has not yet been found, so source of impetus for the moving device locked by the nature is found accordingly; then on this basis and on the premise of unchanged energy consumption, impetus generated by the moving device including the aircraft may be increased markedly; and the inventor further found that a secondary lift source may be produced from an interior of the aircraft, which results in creating a larger impetus and a greater lift for the aircraft.

A technical problem to be solved in the present invention is that: how to making the inner layer formed within the peripheral shell of the moving device to be a layer having slow velocity for fluid, and the outer layer to be a layer having fast velocity for fluid, then a difference in pressure may be generated between the inner and outer layers due to different flow velocities; and how to change fluid distribution of the moving device including the aircraft in motion so as to gain a new, larger driving force and lift source.

For any moving devices moved quickly in fluid, the fluid distribution thereof may be presented by appearance of two fluid layers having different flow velocities are formed internally and externally around the shell of the moving device, of which the inner layer on the surface of the shell is regarded as a fast-flowing layer attributed to fast flow velocity therewith, and the flow velocity may gradually be slowed down outwardly until equal to the flow velocity of large-ranged surroundings which is equivalent to the flow velocity of the outer layer regarded as a slow-flowing layer due to slow flow velocity therewith; so, inevitably, high pressure generated by the slow flow velocity of the outer layer and even the large-ranged surroundings would, along an outside-to-in direction, transfer the pressure difference to the low pressure generated by the fast slow rate of the inner fast-flowing layer, thereby resulting in fluid resistance, which is a new understanding about the cause of the fluid resistance in the present invention.

A conventional moving device including the aircraft would, during fast moving, may lead fluid pressure from the external surrounding fluid to itself and usually have no option but to spend about 90% impetus to overcome the fluid resistance.

In contrast, in the present invention, the flow velocity is slow at the inner layer regarded as a slow-flowing layer, the flow velocity is fast at the outer layer regarded as a fast-flowing layer, and a difference in pressure with an in-to-outside direction may be created between the inner and outer layers due to different flow velocities; the fluid pressure is led to ambient, and the pressure difference is the impetus, consequently, the amount of impetus source can be obtained based on the amount of the decreased fluid pressure.

Thus a new source for the impetus may be acquired by the decreased fluid pressure, where the impetus source is obtained by:

forming two fluid layers having different flow velocities at the inner and outer of the peripheral shell of the moving device, and: when the flow velocity of the inner layer is slower than that of the outer layer, a source of motivation may be obtained; on the contrary, consumption of power may be increased.

On this basis, a greater impetus and lift source of the aircraft is further discovered, of which a first lift source may come from pressure difference generated outwardly due to different flow velocities between the inner fluid layer and the outer fluid layer formed at the shell of the aircraft and the upper surface of the wings respectively.

A second lift source may come from pressure difference generated by the shell of the aircraft and the upper and lower surfaces of the wings.

To solve the above-mentioned technical problem, the present invention provides a moving device including an aircraft having an inner layer and an outer layer arranged in an shell of the aircraft, of which the inner layer is a slow-flowing layer while the outer layer is a fast-flowing layer; and a outward difference in pressure may be generated due to the different velocities between the inner and outer layers, which creates a greater impetus and lift source in the present invention.

The present disclosure provides a high-speed aircraft and an aircraft having greater lift.

According to a first aspect of the present disclosure, the present disclosure provides a high-speed aircraft having a shell and an engine. An outer fluid channel and an inner fluid channel are arranged in succession within the shell. The outer fluid channel and the inner channel are communicated with the exterior through their own air vents respectively. The outer fluid channel is communicated with an air suction inlet of the engine. The shell is optionally provided with a wing.

According to a second aspect of the present disclosure, the present disclosure provides a high-speed aircraft having a shell. An outer fluid channel and an inner fluid channel are arranged in succession within the shell. The outer fluid channel and the inner channel are communicated with the exterior through their own air vents respectively. A spoiler surface is arranged concavely and convexly on a wall face within the outer fluid channel.

According to a third aspect of the present disclosure, the present disclosure provides an aircraft having greater lift. The aircraft includes a shell, a wing and an engine. An inner fluid channel and an outer fluid channel are arranged in succession within an upper surface of the wing. The inner fluid channel and the outer fluid channel are communicated with the exterior through their own air vents respectively. The outer fluid channel is also communicated with an air suction inlet of the engine.

According to a fourth aspect of the present disclosure, the present disclosure provides an aircraft having greater lift which includes a lifting plate, a shell and an engine. An outer fluid channel and an inner fluid channel are arranged in succession within the lifting plate. The inner fluid channel and the outer fluid channel are communicated with the exterior through their own air vents respectively. The outer fluid channel is communicated with an air suction inlet of the engine through an air pipe via a connecting rod.

According to a fifth aspect of the present disclosure, the present disclosure provides a warhead having a cartridge case. An outer fluid channel and an inner fluid channel are arranged in succession within a region between a maximum cross section of the warhead and the front portion of the warhead. The inner fluid channel and the outer fluid channel are communicated with the exterior through their own air vents respectively. A spoiler surface or a spiral spoiler surface is arranged concavely and convexly on a wall face of the channel within the outer fluid channel. An area of the air vent of the inner fluid channel is smaller than an area of the air vent of the outer fluid channel.

The present disclosure has the following advantages:

1. by means of arranging two fluid channels, outer fluid channel and inner fluid channel, having different flow velocities within the shell of the aircraft, and forming high speed fluid on the outer fluid channel and the shell under the action of the suction force of the engine which is much faster in flow velocity compared with the low speed fluid formed on the inner fluid channel, a difference in pressure is produced due to different flow velocities between the inner and outer fluid channels, and a pressure difference transferring circle is created around the fuselage of the aircraft, which changes the direction of original pressure i.e. fluid resistance acted on the shell from outside to inside by surrounding fluid, and accordingly transfers the pressure difference from inside to outside along a direction different from the direction of the original pressure, thereby the impetus source can be obtained as much as the reduction of the fluid resistance produced during operation of the aircraft.

2. by means of arranging two communicated fluid channels, outer fluid channel and inner fluid channel, at a top half of the aircraft and the shell of a top surface of the wing, due to different flow velocities between the inner and outer layers, a zone for transferring pressure difference from inside to outside, acted as a first lift source, is created.

3. due to fluid continuity, a difference in difference, acted as a second lift source, is produced by fluid between a high-speed fluid layer formed at the top half of the shell and a top surface of the wing and a bottom half of the shell in a natural state. The first and the second lift sources further form a greater lift source together for the aircraft.

Figure 1:
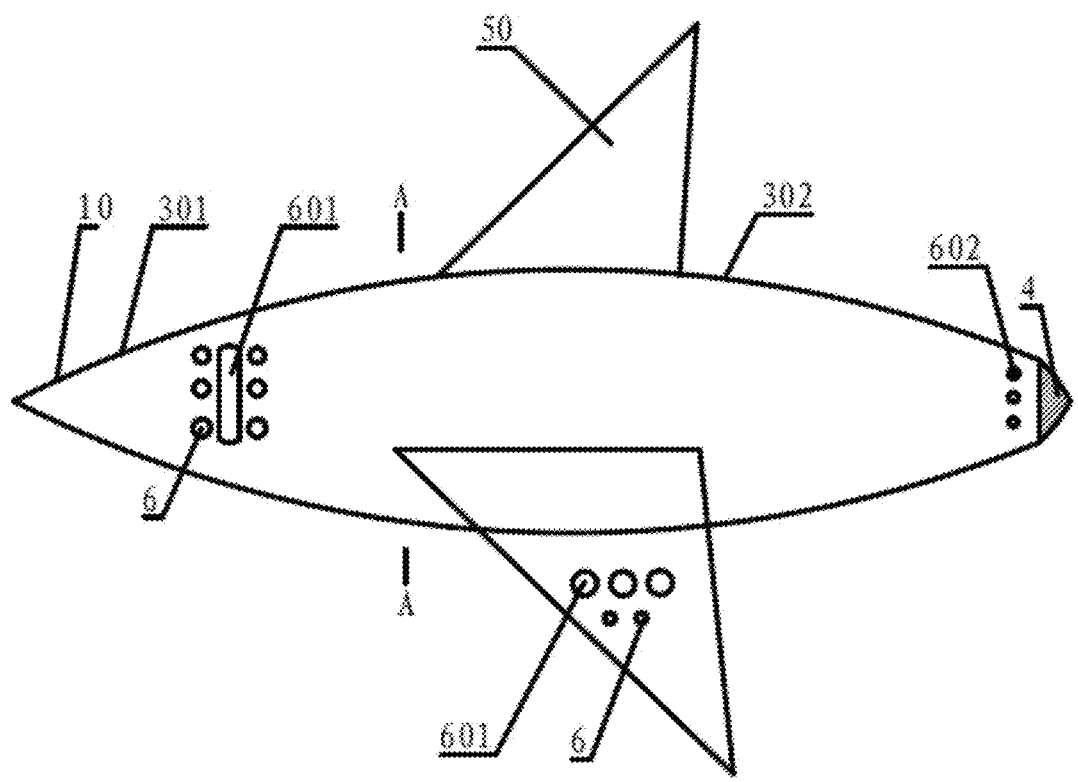
FIG. 1 is a schematic diagram of an aircraft according to an embodiment of the present disclosure.

LIST OF REFERENCE NUMBERS 1. aircraft; 101. fuselage; 102. inner layer shell; 103. top half fuselage; 104. bottom half fuselage; 105. rear fuselage; 106. spoiler surface; 107. spiral spoiler surface; 108. spoiler strip; 10. fuselage shell; 111. missile shell; 113. spoiler surface; 114. spiral spoiler strip; 115. warhead; 116. cartridge case; 117. maximum cross section;

2. inner fluid channel; 3. outer fluid channel; 301. high-speed fluid layer; 302. pressure difference transferring circle; 303. channel;

4. engine; 411. air pipe; 403. lower nozzle; 404. rear nozzle; 405. connecting rod; 411. air outlet; 412. air suction inlet;

5. wing; 501. upper surface; 502. lower surface; 50. wing shell; 511. rear wing;

6. air vent; 601. air vent; 602. duct; 613. small aperture vent; 604. controlling device.

DETAILED DESCRIPTION

For the detailed description of the technical content, structural characteristics, realization of the purpose and effect according to the present disclosure The most critical conception of the present disclosure is that: obtaining impetus source from fluid resistance is proposed originally; from which, based on setting fluid having a velocity on an inner layer larger than that on an outer layer around a shell of a moving device, a difference in pressure from inside to outside is generated, which is opposite to the pressure from outside to inside in direction; such fluid flow from different directions can be cancelled out, whilst the amount of fluid pressure cancelled dictates the size of the impetus source obtained. The decrement of the fluid pressure would transfer to be increase of the impetus source, conversely, the adding of the fluid pressure would transfer to be increase of power consumption; on this basis, a first lift source and a second lift source applied to the aircraft would be created.

The greater the difference in flow velocity between the inner fluid layer and the outer fluid layer, the better the energy-saving effect, and the more impetus source may be obtained; on the contrary, the greater the fluid resistance is, the greater the consumption generated.

Following the laws of nature, high pressure would transfer to low pressure, just like water flows from high to low.

The present disclosure provides a high-speed aircraft including a shell and an engine. An outer fluid channel and an inner fluid channel may be arranged in succession within the shell. The outer fluid channel and the inner fluid channel may communicate with the exterior respectively by means of their own air vents. The outer fluid channel may communicate with an air suction inlet of the engine. The shell may selectively be provided with or without a wing.

Further, the aforesaid high-speed aircraft may still include an inner layer shell arranged between the outer fluid channel and the inner fluid channel. The inner layer shell may be provided with a plurality of air vents communicated with the inner and outer fluid channels. An area of the air vent on the inner fluid channel and an area of the air vent on the inner layer shell are smaller than an area of the air vent on the outer fluid channel.

Further, the aforesaid high-speed aircraft may be provided with a wing on the shell thereof. An inner fluid channel and an outer fluid channel may be arranged within the wing shell. The outer fluid channel of the wing shell may communicate with the outer fluid channel of the shell.

Further, the inner fluid channel and the outer fluid channel of the aforesaid high-speed aircraft may be only arrange within the upper half of the shell and within the upper surface of the wing.

Further, the aforesaid high-speed aircraft may be provided with a controlling device arranged within the air vent. The controlling device may be used for turning on/off of the air vent and changing the opening degree of the air vent.

Further, the aforesaid high-speed aircraft may include a missile, a warcraft and a passenger plane.

The present disclosure further provides another high-speed aircraft including a shell. An outer fluid channel and an inner fluid channel may be arranged in succession within the shell. The outer fluid channel and the inner fluid channel may communicate with the exterior respectively by means of their own air vents. The outer fluid channel is provided inside with a spoiler surface concavely and convexly on a wall of the channel.

Further, the aforesaid another high-speed aircraft may also include an inner layer shell arranged between the outer fluid channel and the inner fluid channel. The inner layer shell may be provided with a plurality of air vents communicated the inner fluid channel with the outer fluid channel. An area of the air vent of the inner fluid channel and an area of the air vent of inner layer shell are smaller than an area of the air vent of the outer fluid channel.

The present disclosure provides an aircraft having greater lift including a shell, a wing and an engine. An inner fluid channel and an outer fluid channel may be arranged in succession within an upper surface of the wing. The inner fluid channel and the outer fluid channel may communicate with the exterior by means of their own air vents respectively. The outer fluid channel may also communicate with an air suction inlet of the engine.

Further, the inner fluid channel may communicate with the outer fluid channel through an air vent of the inner layer shell. An area of the air vents at the inner fluid channel and the inner layer shell is smaller than an area of the outer fluid channel.

Further, a channel is provided within the shell. The channel may communicate with the outer fluid channel within the wing.

Further, an outer fluid channel and an inner fluid channel may be arranged in succession within the upper half of the shell. The inner fluid channel and the outer fluid channel may communicate with the exterior through their own air vents respectively. The outer fluid channel of the shell may also communicate with an air suction inlet of the engine.

Further, a spoiler device may be arranged concavely and convexly within the outer fluid channel.

Further, the outer fluid channel in the shell may communicate with the outer fluid channel in the wing. The engine may be provided with a nozzle at the middle of the lower shell and rear shell respectively.

The present disclosure may also provide an aircraft having greater lift which may include a lifting plate, a shell and an engine. An outer fluid channel and an inner fluid channel may be arranged in succession within the lifting plate. The inner fluid channel and the outer fluid channel may communicate with the exterior by means of their own air vents respectively. The outer fluid channel may communicate with an air suction inlet of the engine through an air pipe via a connecting rod.

Further, the engine may be provided with a lower nozzle and a rear nozzle.

Further, the inner fluid channel and the outer fluid channel may also be arranged in the upper half of the shell. The outer fluid channel may also communicate with the air suction inlet of the engine.

Figure 2:
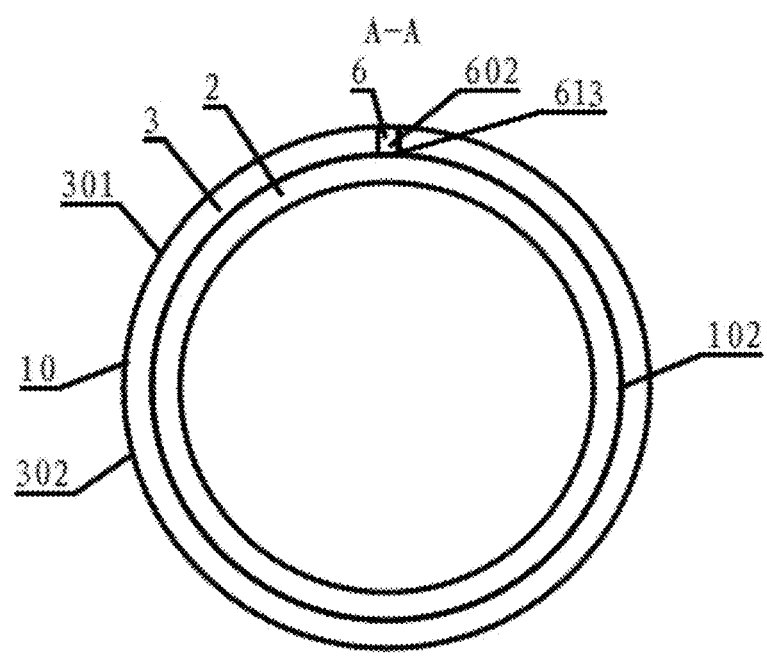
FIG. 2 is a schematically cross-sectional diagram of FIG. 1 along A-A direction.

Referring to FIG. 1 and FIG. 2, a first embodiment of the present disclosure may provide an aircraft. An outer fluid channel 3 and an inner fluid channel 2 may be provided around a fuselage shell 10 of the fuselage of the aircraft. The inner fluid channel 2 may communicate with an air vent 6 at the fuselage shell 10 through a duct 602. The outer fluid channel 3 may communicate with air vents 601 at the fuselage shell. An engine 4, arranged at the rear of the fuselage shell 10, may have an air suction inlet communicated with the outer fluid channel 3 and an air outlet communicated with the exterior. An area of air suction of the air vent 601 may be larger than that of the air vent 6.

When the aircraft flights, fluid may enter into the inner and outer fluid channels from air vents 6, 601 having different sizes; at the moment, the engine 4 may create a powerful suction to suck fluid uniformly distributed around the air vents 601 into the outer fluid channel 3 with high speed, so that fluid uniformly distributed around the air vents 601 at the fuselage shell may be divided and formed two high-speed fluid layers 301 at the surface of the fuselage shell and the outer fluid channel 3 which may have roughly equal flow velocities and communicate with each other.

In this case, due to a small area of air suction of the air vent 6 communicated with the inner fluid channel 2 through the duct 602 having a small area of air suction, the fluid in the inner fluid channel 2 may be flowed in a state of nature; then a higher pressure may be produced due to low flow velocity. The high pressure generated by low flow velocity within the inner fluid channel 2 may, through the duct 602 and the air vents 6 uniformly distributed at the shell 10, transfer pressure difference to low pressure generated by the high-speed fluid layer 301 formed at the fuselage shell 10, thus creating a pressure difference transferring circle 302 around the fuselage shell 10. That is, the fluid pressure acted on the fuselage shell 10 during the flight of the aircraft may be transferred from inside to outside, forming a pressure transferring circle 302 around the aircraft.

Since the direction of the fluid pressure in the pressure difference transferring circle 302 is different from the direction of fluid pressure which is from outside to inside around the aircraft, the fluid pressure with different directions may meet at the shell and cancel with each other, and the decreased amount of the fluid resistance may be roughly equal to the cancelled amount of the fluid pressure, from this, the amount of the impetus source used for the aircraft may be obtained by the decreased amount of the fluid resistance.

The greater the difference in flow velocities of the inner fluid channel 2 and the outer fluid channel 3, the more the generated pressure difference, and the more the fluid pressure transferred from inside to outside; obviously, under a powerful suction state of the engine 4, the flow velocity in the outer fluid channel 3 may be much faster than the flow velocity in the inner fluid channel 2. With controlling to the engine 4, the flow velocity in the outer fluid channel 3 may be several times, ten times and even more times, faster than that in the inner fluid channel 2 with ease, thus a greater pressure difference between the inner and outer layers may be generated, and more fluid pressure may be transferred from inside to outside, forming a pressure difference transferring circle 302 around the aircraft. By means of transferring part or even most of the fluid pressure outwards, the fluid resistance may be decreased, the load capability may be increased, the flying range may be enlarged, the velocity may be improved, and the power consumption may be reduced. Apparently, under the dynamic action, the difference in fluid pressure generated between the outer and inner layer may be at least ten times, which results in certainly not only a 10% reduction of fluid resistance, but more and thus gains greater impetus source.

In this case, without any increase in power, the aircraft fly much faster, doubling the radius of the flight, which making the features of the aircraft in the present application may be far beyond the concept of an available aircraft, thereby creating a truly energy-efficient and high-speed aircraft.

Since the Industrial Revolution happened over 200 years ago, a basic theory of moving device generating source of impetus and a structure thereof have never changed. So far, there are no efficient theories, methods and devices to overcome fluid resistance. The reason is that, in the conventional moving device, the inner layer thereof is regarded as a fast-flowing layer attributed to fast flow velocity therewith, and the flow velocity may gradually be slowed down outwardly until equal to the flow velocity of large-ranged surroundings which is equivalent to the flow velocity of the outer layer regarded as a slow-flowing layer due to slow flow velocity therewith; so, inevitably, high pressure generated by the slow flow velocity of the outer layer and even the large-ranged surroundings would, along an outside-to-in direction, transfer the pressure difference to the low pressure generated by the fast slow rate of the inner fast-flowing layer; since the surrounding pressure is led to itself and more extra fluid pressure is generated, a larger fluid resistance to the moving device is produced; about 90% impetus of the conventional movement-driving device including the aircraft is applied to overcome fluid resistance, leaving only 10% or less impetus on driving itself, which is a new understanding about the cause of the fluid resistance in the present invention.

Therefore, the first impetus source is discovered in that: making two fluid layers having different velocities at the inner and outer around the shell of the moving device; when the flow velocity of the inner layer is slower than that of the outer layer, a source of motivation may be obtained; on the contrary, consumption of power may be increased. The greater the difference in flow velocity between the inner fluid layer and the outer fluid layer, the greater the pressure difference generated. The slower the inner layer compared to the outer layer in flow velocity, the more reduction in fluid resistance, and the more acquisition in impetus source. Conversely in a conventional moving device, the faster the inner layer compared to the outer layer in flow velocity, the more increase in fluid resistance, and the more increase in power consumption. This is one to one relationship.

It is worth mentioning that: the flow velocity in the outer fluid channel 3 may be much faster than the flow velocity in the inner fluid channel 2 under the effect of powerful suction, which may result in at least ten times of pressure difference therebetween, so that a current situation of the conventional moving device, which may use about 90% impetus to overcome fluid resistance during operation, leaving only 10% or less impetus on driving itself, may be reversed radically. After reversal, if transferring fluid pressure of 10% outwardly, at least about 50% impetus source would be added to the moving device according to the present application; and if transferring fluid pressure of 20%, 40%, 70% or more outwardly, multiple times of impetus source would be acquired for the moving device; which may enhance energy utilization rate of all moving devices including aircrafts many times, resulting in improving worldwide energy sources many times.

Thus, the present application may produce a revolutionary change to all moving devices including aircrafts and a profound influence on its future development.

Referring to FIG. 1 and FIG. 2, a second embodiment of the present application may include an aircraft.

Unlike the first embodiment, the duct 602 and the air vent 6 are removed. A plurality of small aperture vents 613 having a relatively small aperture may be arranged uniformly at the inner layer shell 102 for communicating the inner fluid channel 2 with the outer fluid channel 3. The outer fluid channel 3 may communicate with the exterior through the air vent 601.

When the aircraft flights, the engine may create a powerful suction to suck in fluid with high speed on the shell more easily through the relatively big air vents 601, forming two high-speed fluid layers 301 having roughly equal flow velocities at the outer fluid channel 3 and the surface of the shell. Since the area of air suction of the air vent 601 is much bigger than that of the small aperture vent 613, the flow velocity at the outer fluid channel is much faster than that at the inner fluid channel. Due to the powerful suction of the engine, the flow velocity in the outer fluid channel may be extremely fast and much faster than the flow velocity in the inner fluid channel. A great pressure difference may be generated between the inner and outer channels due to a distinct difference in flow velocity. Through the plurality of air vents 613 uniformly arranged at the inner layer shell 102, the high pressure produced by the relatively low flow velocity within the inner fluid channel 2 may be transferred with pressure difference to the high-speed fluid layer 301 formed by the outer fluid channel 3, thus creating the pressure difference transferring circle 302 around the fuselage shell 10, making the outside-to-inside fluid pressure generated during the flight of the aircraft and acted on the shell to be transferred in the opposite direction, i.e. from inside to outside, which may greatly reduce the fluid resistance during flight. Comparing with the first embodiment, as an improvement in the second embodiment, the small aperture vent 613 is arranged at a part of the inner layer shell 102, and another part of the inner layer shell may communicate with the air vent 6 through the duct 602.

Figure 3:
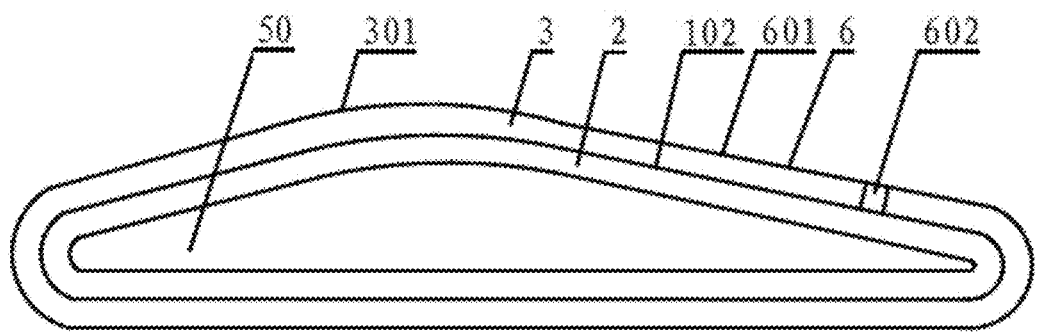
FIG. 3 is a schematically cross-sectional diagram of an aircraft according to an embodiment of the present disclosure.

Referring to FIGS. 1-3, a third embodiment of the present application may include an aircraft.

An outer fluid channel 3 and an inner fluid channel 2 are arranged around the upper and lower surfaces within the wing shell 50 of the aircraft. The outer fluid channel 3 within the fuselage shell 10 may communicate with the outer fluid channel 3 within the wing shell.

When the aircraft flights, the engine 4 may create a powerful suction to suck fluid into the outer fluid channel with high speed through the air vents 601 uniformly arranged on the fuselage and the wing shell, forming a high-speed fluid layer 301 around the fuselage and the wing. An extremely large pressure difference may be generated between the high-speed fluid layer and the inner fluid channels 2 at the fuselage shell 10 and within the wing shell 50 due to different flow velocities, creating the pressure difference transferring circle 302 around the fuselage and the wing. Obviously, the flow velocity in the outer fluid channel 3 may be easily much faster than the flow velocity in the inner fluid channel 2 with several times, at least ten times and even more times. By means of transferring more fluid resistance outward to cancel the surrounding fluid pressure each other which is opposite in direction, the fluid resistance around the shell of the fuselage and the wing may be reduced and transferred to be a greater impetus source during flight, thus creating an energy-efficient and high-speed aircraft having a new structure.

Referring to FIGS. 1-3 and FIG. 12, a fourth embodiment of the present application may include an aircraft having larger lift.

The outer fluid channel 3 and the inner fluid channel 2 communicated with the exterior may be arranged within the upper half of the fuselage shell 10 and within the upper surface of the wing. The air vent 601 may communicate with the air suction inlet of the engine 4 through the outer fluid channel 3. The inner fluid channel 2 may communicate with the air vent 6 through the duct 602, or/and communicate with the outer fluid channel through the air vents 613.

When the aircraft flights, the engine may create a powerful suction to suck fluid with high speed into the outer fluid channel 3 through the air vents 601 uniformly arranged at the upper half of the fuselage shell 10 and the upper surface of the wing shell 50, forming high-speed fluid layers 301 within top half fuselage and upper surface of the wing. Due to different flow velocities, an extremely large pressure difference may be generated between the high-speed fluid layer and the inner fluid channels 2 in which the fluid may have low velocity and high pressure, creating the pressure difference transferring circle 302 at the top half fuselage and the upper surface of the wing. By means of changing the fluid resistance generated by the surrounding fluid acted on the top half fuselage and/or the top surface of the wing during the aircraft's flight to be transferred pressure difference in an opposite direction i.e. upward direction, and transferring the fluid pressure generated by outside fluid which acts on the shell from outside to inside in an opposite direction i.e. from inside to outside and upward direction, the inside-out and down-up pressure difference transferring circle 302 may be formed at the entire shell. Under such circumstances, since the pressure downward reduces and the pressure upward increases on the entire shell, the entire shell may be moved upward instantly by the fluid pressure, and the shell may completely go up under the instant push by the upward fluid pressure. Such change is regarded as lift. Therefore a first lift source may be obtained. The first impetus source according to the present application may be acquired by:

providing an inner fluid layer and an outer fluid layer which may communicate with the exterior and have different velocities at the top of the aircraft and/or at the top of the wing. An inside-out pressure difference, which is regarded as the first lift source, may be generated due to the different velocities.

The greater the pressure difference generated between the inner and outside layers, the larger the first lift source obtained. Obviously, under the powerful suction of the engine, the flow velocity in the outer fluid channel may be much faster than the flow velocity in the inner fluid channel with ten times and even more times, thus generating at least ten times of pressure difference and lift.

The second impetus source according to the present application may be acquired by:

the pressure difference between the high-speed fluid layer formed at the upper fuselage and/or upper wing of the aircraft and the lower shell having a flow velocity in a natural state, where the pressure difference is generated due to fluid continuity.

The greater the pressure difference generated within the upper and lower fuselage and between the upper and lower parts of the wing due to different velocities, the larger the second lift source obtained. Obviously, under the powerful suction of the engine, the flow velocity in the outer fluid channel 3 may be much faster than the flow velocity in the lower shell with ten times and even more times, thus generating at least ten times of pressure difference and lift.

The first lift source may differ from the lift generated by a conventional wing. For the conventional wing, the lift may only be generated when the fluid which may flow through different paths on the upper and lower surfaces thereof arrives at the rear together; while the first lift source according to the present application may be generated when the fluid flows through the surface of the shell. In the present application, the first lift source may be generated between the inner and outer fluid layers due to different velocities.

The second lift source may be identical to the lift generated due to fluid continuity at the conventional wing; however, due to the powerful suction of the engine in the present application, the flow velocity at the high-speed fluid layer formed at the upper shell and/or the upper wing is at least ten times faster than the flow velocity in the lower shell at which the fluid flow in a natural state, a greater difference pressure may be produced between the upper and lower parts of the shell, thus generating a large lift source which is at least ten times greater than the pressure difference and lift which have a tiny distinction and may be generated between the arc upper surface and the planar lower surface of the conventional wing.

The first and the second lift sources in turn form a greater lift source together for the aircraft according to the present application.

Figure 11:
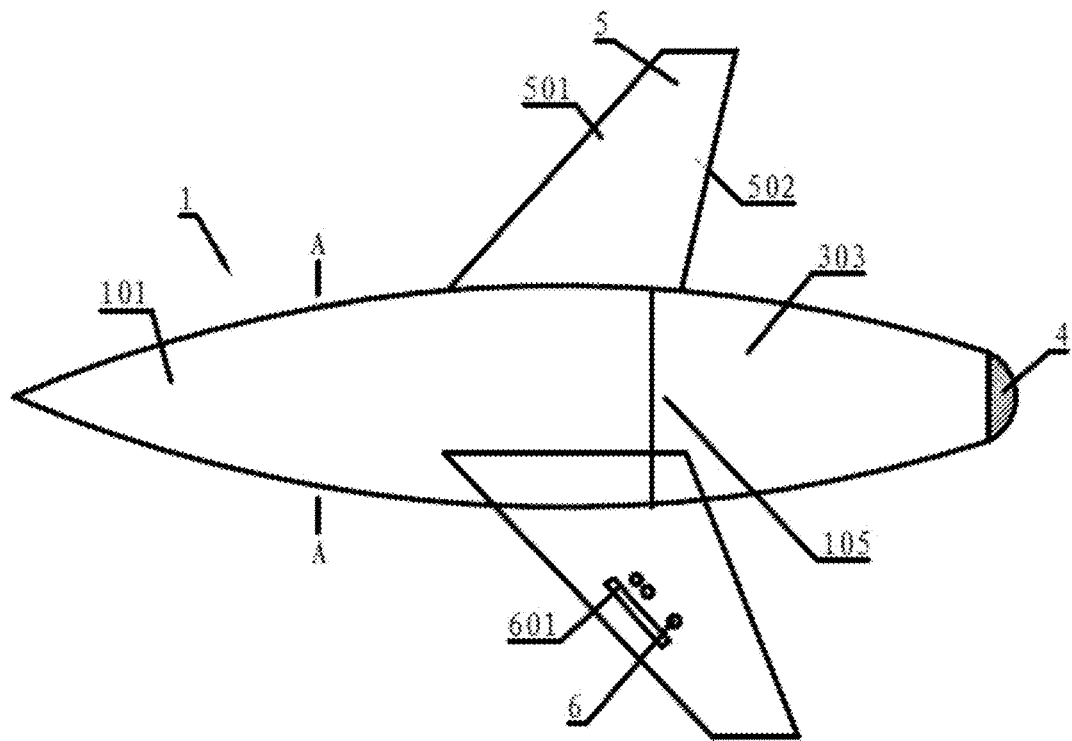
FIG. 11 is a schematic diagram of an aircraft according to an embodiment of the present disclosure.
Figure 12:
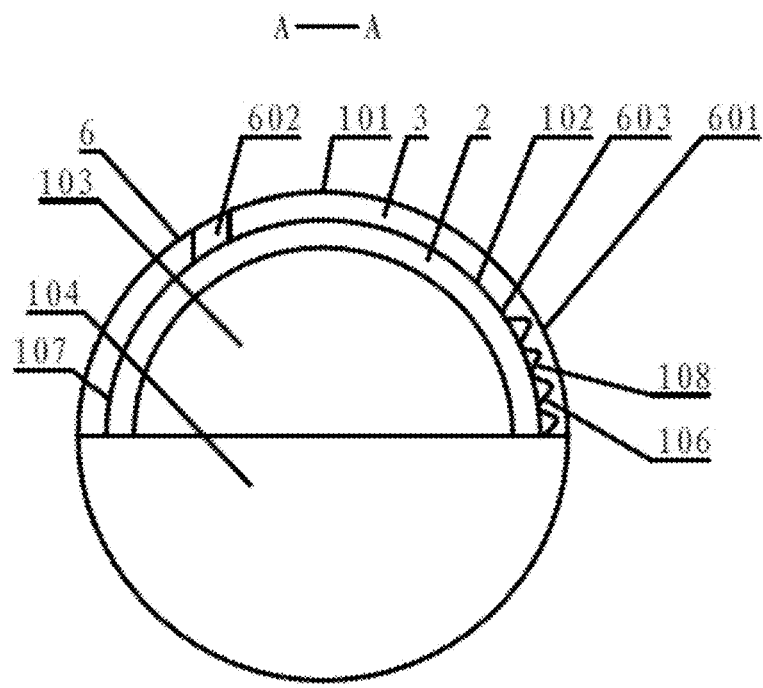
FIG. 12 is a schematically cross-sectional diagram of FIG. 11 along A-A direction.

Referring to FIG. 11 and FIG. 12, a fifth embodiment of the present application may include an aircraft having larger lift.

The aircraft may include a shell, a wing 5 and an engine 4. Unlike the above-mentioned embodiment, a channel 303 may be arranged at the rear of the top half 103 of the shell. An outer fluid channel 3 and an inner fluid channel 2 may be arranged within the upper surface of the wing 5. The engine 4 may communicate with the outer fluid channel 3 in the wing 5 and the air vent 601 through the channel 303. The inner fluid channel 2 may communicate the exterior through the duct 602 and the air vent 6; or communicate with the outer fluid channel 3 through the small aperture vent 613. The area of the air vents 6, 613 may be smaller than that of the air vent 601 of the outer fluid channel 3.

Under the powerful suction of the engine, the upper surface 501 of the wing may be the only intake source for the engine, the flow velocity in the outer fluid channel 3 may be at least ten times faster than that in the inner fluid channel 2, so that a pressure difference transferring circle 302 having at least ten times of difference may be formed instantly at the entire upper surface 501 of the wing, thus acquiring the first lift source in the present application.

Further, a greater pressure difference may be generated between the high-speed fluid layer 301 at the upper surface of the wing and the lower surface at which the fluid flows in a natural state, thus acquiring the second lift source.

The first and the second lift sources form a greater lift source together for the aircraft.

Further, the rear channel 303 of the top half 103 of the shell may be a tubular channel. The engine may communicate with the outer fluid channel 3 and the air vent 601 within the wings 5 at both sides through the tubular channel 303, so that the upper surface of the wings of the aircraft may become the unique air vent of the engine.

The discovery of the first and second lift sources generated from the inner and outer fluid layers according to the present application may lead the development of the aircraft to a new era.

Figure 4:
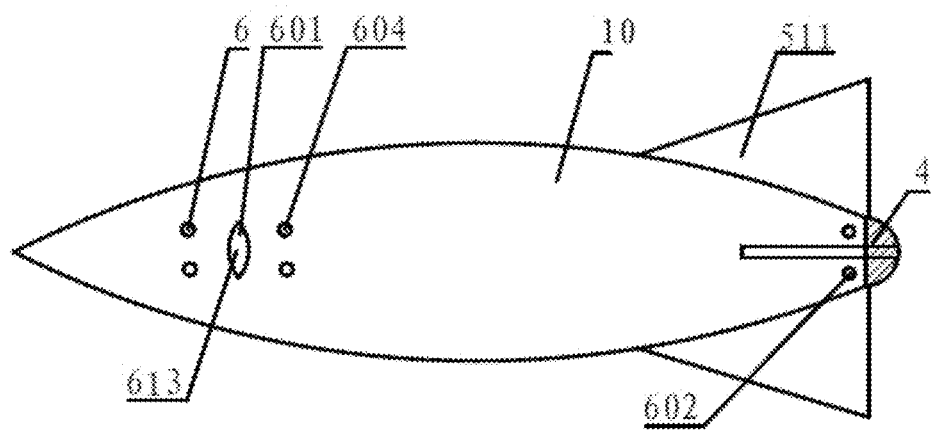
FIG. 4 is a schematic diagram of an aircraft having no wings at both sides according to an embodiment of the present disclosure.

Referring to FIG. 2 and FIG. 4, a sixth embodiment of the present application may include a supersonic aircraft having no wings at both sides but a rear wing 511 to control direction. A controlling device 604 may be arranged within the air vent 601 for controlling open and closure of the air vent and changing the opening degree of the air vent. Due to removal of wings at both sides and no intake channel of a conventional aircraft, the area of windward side may be reduced by about 80% compared with the conventional aircraft, the aircraft in the present application may naturally increase its speed and consume less energy.

When the aircraft flights, at least ten times of fluid pressure difference may be formed between the inner and outer layers under the powerful suction of the engine, creating a pressure difference transferring circle 302 around the shell of the aircraft. Since the pressure difference transferring circle and the surrounding fluid pressure may cancel with each other, and the decreased amount of the fluid resistance may be equal to the cancelled amount of the fluid pressure, from this, the amount of the impetus source used for the aircraft may be obtained by the decreased amount of the fluid resistance, and the speed of the aircraft may be improved accordingly. Thus the impetus source may be acquired according to the present application.

Further, by means of closing the air vent 601 at the bottom half of the aircraft by the controlling device 604, a high-speed fluid layer 301 may be formed at the top half 103 of the aircraft under the power suction of the engine, and the pressure difference transferring circle 302 may be created, thus obtaining a first lift source of the present application.

Further, a huge pressure difference may be produced between the high-speed fluid layer 301 formed at the top half 103 of the aircraft and the bottom half 104 at which the fluid may flow in a natural state, resulting in a greater lift, thus obtaining a second lift source of the present application.

Further, the duct 602 and the air vent 6 may be removed totally or partly. A plurality of small aperture vents 613 having a relatively small aperture may be arranged uniformly at the inner layer shell 102 of the inner fluid channel 2 for communicating with the high-speed fluid layer 301 at the outer fluid channel 3.

In the present application, the impetus source may come due to the reduction of the fluid resistance, i.e. the amount of reduction in fluid resistance may mean the amount of increase in impetus; the area of windward side may be reduced by about 80% due to the removal of wing and air-intake channel; and the first and second lift sources may be obtained simultaneously, which may be at least ten times of lift compared with conventional wing; thus creating a supersonic aircraft carrying people or no people.

Figure 5:
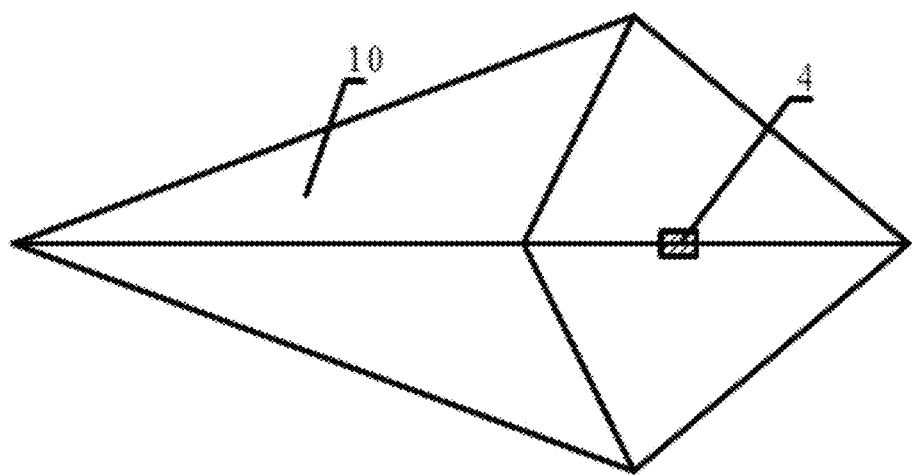
FIG. 5 is a schematically structural diagram of a triangular aircraft according to an embodiment of the present disclosure.
Figure 6:
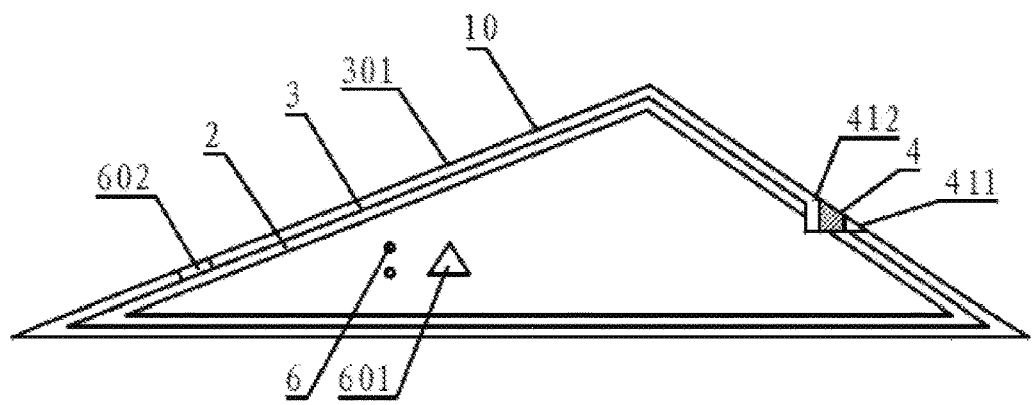
FIG. 6 is a schematically cross-sectional diagram of a triangular aircraft according to an embodiment of the present disclosure.

Referring to FIG. 5 and FIG. 6, a seventh embodiment of the present application may include a triangular aircraft which may appear as a triangle from any sides including top view, upward view, front view and side view. The triangle is best in stable structure. The aircraft can be formed by several plate-like structures. It is much simpler than a conventional aircraft in manufacture with low cost and superior performance. Meanwhile, the polyhedron is a best stealth structure. Such special structure of the aircraft can be used in unmanned aerial vehicles.

The triangular aircraft is formed by several plate-like triangular structures connected together. The fuselage and the wings are integrated to be a carrying space in which people or cargo may be received. An outer fluid channel 3 and an inner fluid channel 2 may be arranged around within the fuselage shell, each communicating with the exterior through their own air vents 601, 1.

The engine 4 may be arranged at the middle of the rear shell of the top half of the aircraft. The air suction inlet 412 of the engine 4 may communicate with the exterior through the outer fluid channel 3 and a plurality of air vents 601 uniformly distributed. The air outlet 411 of the engine 4 may communicate with the exterior. Under the powerful suction of the engine, the high-speed fluid layer 301 may be formed at the outer fluid channel 3 and the shell. A huge pressure difference may be produced between the high-speed fluid layer and the inner fluid channel in which the fluid may flow at a low velocity with high pressure, creating a pressure difference transferring circle 302, thus obtaining the impetus source, the first lift source and the second lift source of the present application. Further, the engine may be arranged between a bottom plane of the rear fuselage shell and the upper joint part.

Figure 7:
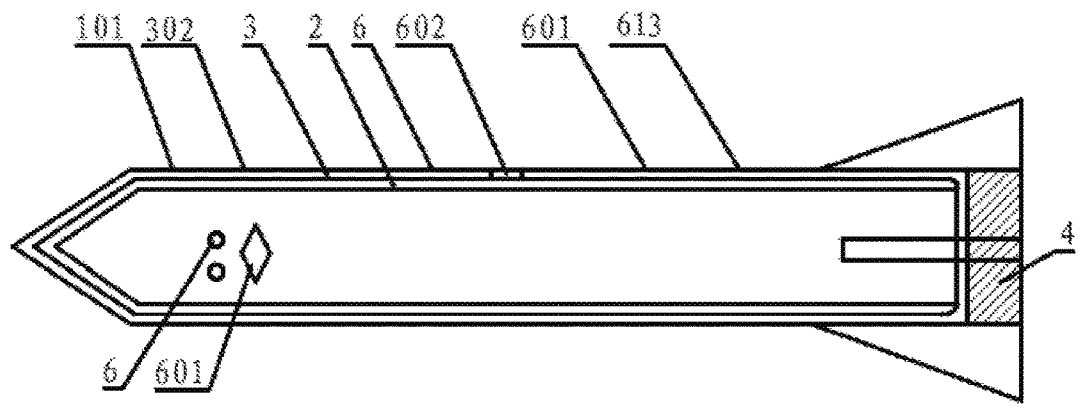
FIG. 7 is a schematically structural diagram of a missile according to an embodiment of the present disclosure.

Referring to FIG. 2 and FIG. 7, an eighth embodiment of the present application may include a missile.

An outer fluid channel 3 and an inner fluid channel 2 may be arranged within the peripheral shell of the missile 111, each communicate with the exterior through their own air vents 601, 6 or small aperture vents 603. Due to the powerful suction produced when the engine 4 operates, a high-speed fluid layer 301 may be formed at the outer fluid channel 3 and the inside and outside of the shell, which may generate a huge pressure difference with the inner fluid channel 2 due to different velocities. Then a pressure difference transferring circle 302 may be produced around the missile for transferring part even most of the fluid resistance outward, which may greatly improve the speed of the missile, resulting in obtaining the impetus source of the present application.

Figure 15:
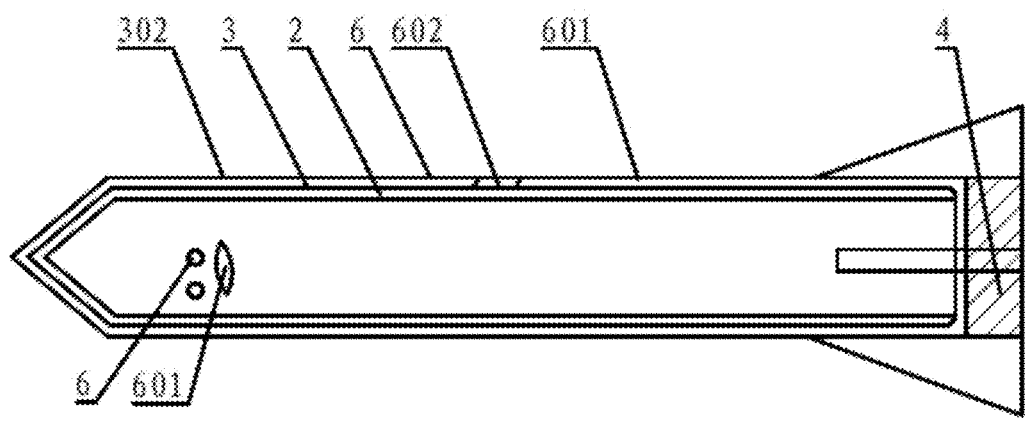
FIG. 15 is a schematic diagram of a missile according to an embodiment of the present disclosure.

Further, referring to FIG. 15, the aforesaid pressure difference transferring circle 302 may be formed at the top half of the missile to obtain the first and second lift sources of the present application. Due to the generated great lift, the missile may have a faster speed, a less energy consumption and a larger load capacity. By means of providing a controlling device at the air vent 601 for opening and closing the air vent or changing the open degree of the air vent, forming pressure difference locally at the shell, and producing pressure difference at the surface of the shell based on requirement, the shell may go up or down or turning so as to make the missile more accurate.

Since the conventional missile could not generate lift, the fluid resistance faced during flight may be huge and the energy consumption may be very large, which seriously effects the future development of the missile. The impetus source, the first and second lift sources of the present application may open a new direction for the development of the missile.

Figure 8:
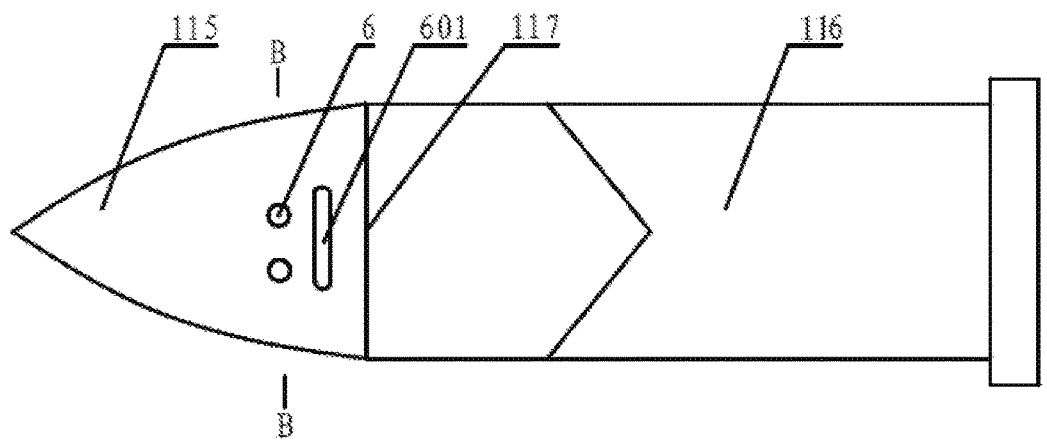
FIG. 8 is a schematically structural diagram of a cartridge according to an embodiment of the present disclosure.
Figure 9:
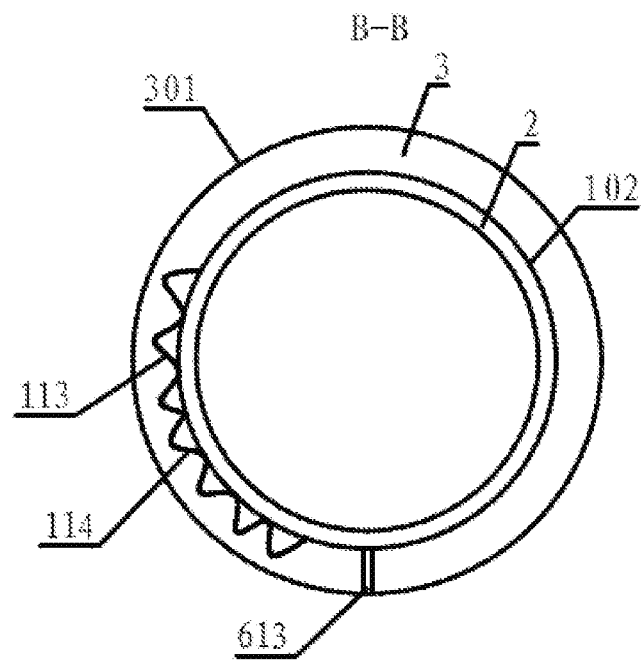
FIG. 9 is a schematically cross-sectional diagram of FIG. 8 along B-B direction.

Referring to FIG. 8 and FIG. 9, a ninth embodiment of the present application may include a bullet, an inertial driving aircraft.

The bullet may include a warhead 115 having a conical tail and a cartridge case 116. An outer fluid channel 3 and an inner fluid channel 2 may be arranged in succession within a region between a maximum cross section 117 of the warhead 115 and a top end of the warhead. The inner fluid channel 2 and the outer fluid channel 3 may communicate with the exterior through their own air vents 6, 601. A spoiler surface 113 or a spiral spoiler surface 107 may be arranged concavely and convexly within the outer fluid channel 3.

When it is fired, due to the conical tail of the warhead 115, the contact surface may be increased exponentially after gunpowder explosion compared with a flat tail, the impetus generated may be also improved greatly. The conical tail may occupy a position in a negative pressure zone so that the fluid may flow along the conical shell and converge around the top end of the conical structure, which may significantly reduce the resistance of the negative pressure and improve the speed. Generally, part of the shell in the front of the maximum cross section 117 of the warhead 115 may contact with the spiral rifling within a gun-barrel to accelerate the fire of the bullet, the warhead may fly along a parabolic path under the effect of inertia force and produce an extremely force of friction with the fluid, which may shorten the flying distance of the bullet. Therefore fluid resistance may be an only factor affecting speed and distance of the bullet.

In this case, the fluid may enter into the inner and outer fluid channels through the air vents 601, 6. Since the area of air vent 601 is much greater than the area of the air vent 6, more fluid may enter into the outer fluid channel 3. Since the outer fluid channel 3 is provided with the spoiler surface 113 concavely and convexly on the surface thereof, especially the spiral spoiler surface 107 which may lengthen the path passed by the fluid at least five times, that is, the path passed by the fluid on the outer fluid channel 3 is five times longer than the corresponding path passed by the fluid on the inner fluid channel 5, two high-speed fluid layers 301 having roughly equal flow velocities at the surface of the shell and the outer fluid channel 3. The velocity at the high-speed fluid layer 301 is faster than that at the inner fluid channel 2, resulting in a five times of pressure difference transferring circle 312, thus obtaining the impetus source of the present application from the reduction of the fluid resistance.

Further, the aforesaid structure may also be suitable for a cannonball, thus creating a high-speed and long-range cannonball. It is worth mentioning that, the only factor affecting the firing range and speed of the bullet and cannonball may be the fluid resistance. In the present application, the speed and the firing range of the bullet or the cannonball can be enhanced by the pressure difference transferring circle 302 without increasing gunpowder. The present application may open a new direction for the future development of the cartridge.

Figure 10:
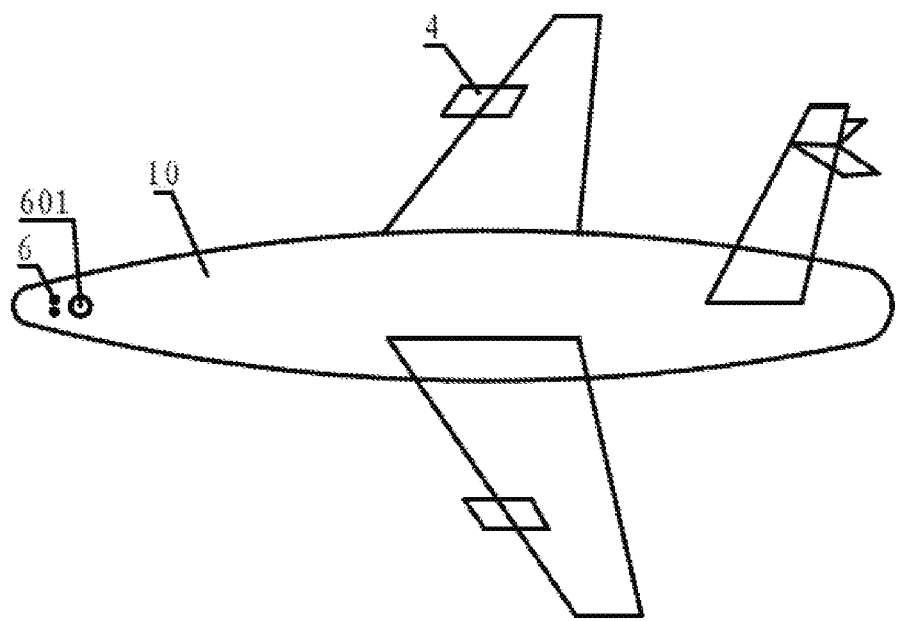
FIG. 10 is a schematically structural diagram of a passenger plane according to an embodiment of the present disclosure.

Referring to FIG. 3, FIG. 9 and FIG. 10, a tenth embodiment of the present application may include an aircraft having no aforesaid engine.

Two layers, an outer fluid channel 3 and an inner fluid channel 2, may be arranged within the peripheral fuselage shell 10 or/and within the upper and lower surfaces within the wing, each communicating the exterior through their own air vents 601, 6. The spoiler structure may be a convex and concave spoiler surface, a spiral spoiler surface or a spiral spoiler strip for extending path passed by the fluid.

A spoiler surface 113 may be concavely and convexly on at least one side face of the outer fluid channel 3, or a plurality of spiral spoiler strips 114 may be uniformly arranged within the outer fluid channel 3, so that the path passed by the fluid in the outer fluid channel is greater than the path in the inner fluid channel 2.

The conventional aircraft may use about 90% impetus to overcome fluid resistance and only about 10% impetus to drive the aircraft to run normally during high-speed travel. With the pressure difference transferring circle 302, about 10% of fluid resistance may be reduced by transferring about 10% of fluid resistance outward, which may improve the impetus of the aircraft about at least 50%.

Apparently, the path passed by the fluid may be extended at least five times especially for the spiral spoiler strip 114, so that the pressure difference between the inner and outer layers may be at least five times. Accordingly, five times of pressure difference transferring circle 302 may not only reduce about 10% of fluid resistance, but more fluid resistance. A large amount of fluid on the shell may enter into the outer fluid channel through every air vent 601, forming two high-speed fluid layers 301 at the outer fluid channel and the surface of the shell, which may produce at least five times of pressure difference with the inner fluid channel. With such pressure difference, at least five times of pressure difference transferring circle 302 may be generated around the peripheral fuselage and the upper and lower surfaces of the wing, which may greatly reduce the fluid resistance during flight, thus transforming into at least 50% of impetus source, and obtaining the impetus source of the present application.

Figure 14:
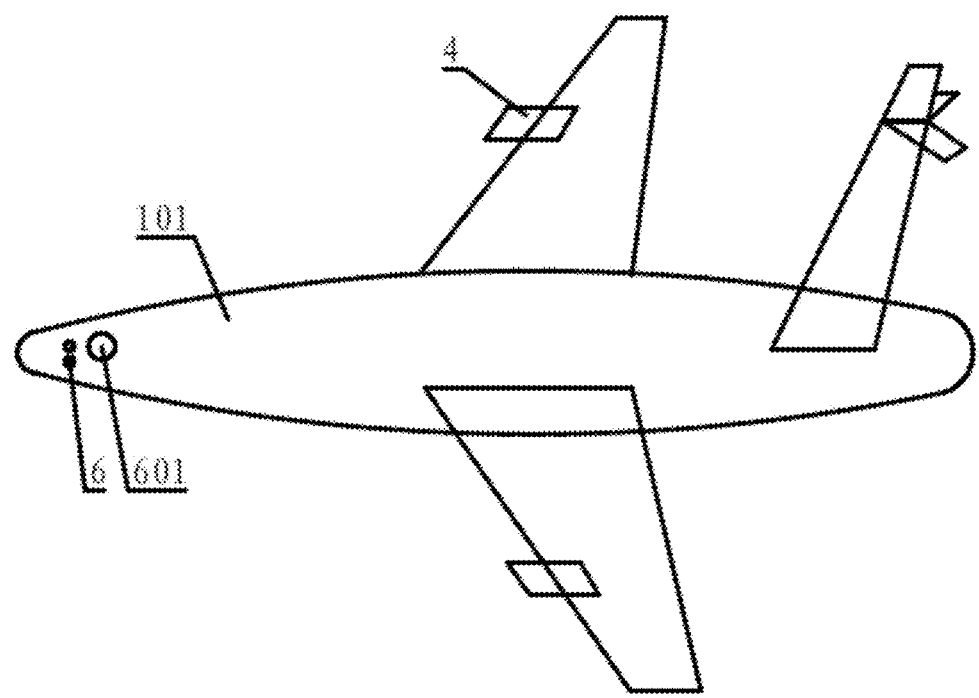
FIG. 14 is a schematically structural diagram of a helicopter according to an embodiment of the present disclosure.

Further, referring to FIG. 12 and FIG. 14, an outer fluid channel 3 and an inner fluid channel 2 may be arranged within the top half fuselage shell 10 or/and the upper surface of the wing, each communicating with the exterior through their own air vent 601, 6. A plurality of spiral spoiler strips 114 may be uniformly arranged within the outer fluid channel, so that the path passed by the fluid may be at least five time longer than the path in the inner fluid channel 2; thus forming an at least five times of pressure difference transferring circle 302, resulting in generating the first and second lift sources.

This embodiment may also generate large pressure difference and lift without an engine, which may be suitable for various aircrafts.

Figure 13:
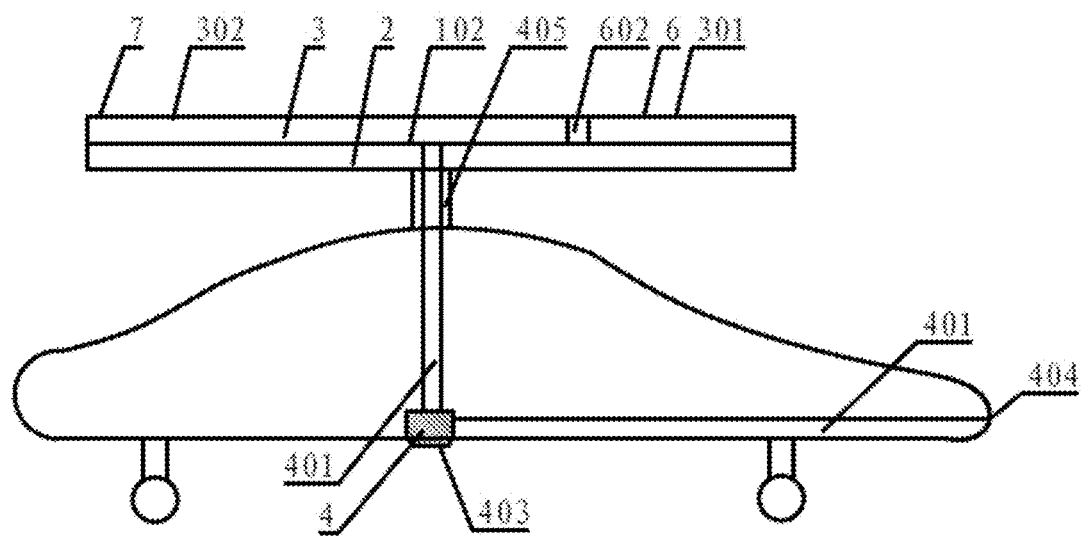
FIG. 13 is a schematically structural diagram of a passenger plane according to an embodiment of the present disclosure.

Referring to FIG. 13, an eleventh embodiment of the present application may include a helicopter having greater lift. Unlike a conventional helicopter, in the helicopter of the present application, the propeller is replaced by a fixed hollow lifting plate 7 connected with the fuselage through a connecting rod 405. An air pipe 401 may pass through the connecting rod 405. An outer fluid channel 3 and an inner fluid channel 2 may be arranged within the upper surface of the lifting plate 7, each communicating with the exterior through their own air vents 601, 6 or small aperture vents 613. An engine 4 may be arranged at the bottom within the fuselage shell. A plurality of air vents 601 may be arranged uniformly at the upper surface of the lifting plate 7 and communicate with an air suction inlet of the engine 4 through the outer fluid channel 3 and an air pipe 401. A lower nozzle 403 and a rear nozzle 404 may be arranged at the engine 4. The rear nozzle 404 may communicate with the engine 4 through the air pipe 401.

Under the powerful suction of the engine, an at least ten time of pressure difference transferring circle 302 may be generated between the inner and outer layers of the upper surface of the lifting plate 7, thus obtaining a first lift source, of which the greater the velocities between the inner and outer fluid layers, the larger the lift generated. Due to different velocities between the high-speed fluid layer 301 at the upper surface of the lifting plate 7 and the lower surface in which the fluid may flow in a natural state, a greater pressure difference may be generated, thereby obtaining a second lift source.

Further, a lower nozzle 403 and/or a rear nozzle 404 may be arranged at the engine 4. When using one of the nozzles, another may be closed. This embodiment may be a combination of the helicopter and a supersonic plane.

Further, under the powerful suction of the engine, a high negative pressure zone may be formed at the upper surface of the lifting plate 7. By ejecting high speed fluid with the nozzle 403 of the engine arranged at the bottom of the shell of the aircraft, a high forward-driving zone may be formed. Hence, the aircraft may be pushed to go up easily by the nozzle 403 of the engine arranged at the bottom of the shell of the aircraft.

Under such circumstances, a high positive pressure and a high negative pressure between the upper and lower parts of the aircraft may be formed between the high negative pressure zone at the upper surface of the lifting plate 7 and the high pressure zone at the bottom of the shell, so that a huge pressure difference may be generated between the high positive pressure and a high negative pressure between the upper and lower parts of the fuselage, and in turn, the high pressure generated at the high positive pressure zone at the bottom may transfer pressure difference to the low pressure generated at the high negative pressure zone at the top. Such transferring pressure difference from the bottom up may produce a greater second impetus source for the aircraft. For the conventional helicopter, the first impetus comes from the propeller. Therefore, the second impetus may even exceed the conventional first impetus, which is because that the propeller ejects the intake fluid downward, making a great resistance to the fuselage and consuming its impetus. Accordingly the first impetus for the conventional helicopter may not be formed perfectly.

When the helicopter is aloft, the lower nozzle 403 may be closed and the rear nozzle 404 may be employed to eject fluid backwards to drive the aircraft move forwards. Especially, the aircraft may move in a faster flying speed when the engine propels at the posterior. Thus a new helicopter with higher speed, larger load capacity and more energy efficiency may be created.

Further, referring to FIG. 12, the outer fluid channel 3 and the inner fluid channel 2 may also be arranged within the top half fuselage shell. The plurality of air vents 601 may communicate with the air suction inlet of the engine 4 through the outer fluid channel 3.

Further, the outer fluid channel of the top half fuselage and the upper surface of the lifting plate may communicate with the air suction inlet of the engine 4, so that the first lift source and the second lift source may be generated respectively at the fuselage and the upper and lower parts of the lifting plate. The accumulation of the first lift source and the second lift source may form a greater lift and impetus source together.

Further, the pressure difference transferring circle 302 may arranged in a region formed between the maximum cross section of the fuselage and the front portion, which may produce a high negative pressure zone which may generate pressure difference with a high positive pressure formed by the rear nozzle 404. The high pressure generated at the high positive pressure zone at the posterior may inevitably transfer pressure difference forwards to the negative pressure zone. Such transferring pressure difference from back to front may produce the second impetus source. The greater the pressure difference generated between the positive and negative pressure at the front and rear part, the larger the impetus generated. The other aforesaid aircraft may also generate the second impetus source based on such structure. The impetus source obtained by the aircraft in the present application may come from:

the pressure difference generated by the positive and negative pressure between the rear and front parts of the shell or the upper and lower parts of the aircraft.

Like the conventional helicopter having propeller, in the present application, when going up and down or turning during the helicopter's flight, with controlling the flexible connection between the lifting plate and the connecting rod 405, going up and down or turning can be completed by changing the angle of the lifting plate from side to side and front to back; which may be common in the art.

The reason in slow development of helicopter is that the structure of the propeller is limited, the lift generated by the spinwing is small, and no lifting plate used for generating lift source for going straight upwards can be found to replace the propeller. In the present application, the well-known structure of the conventional helicopter is changed, a greater lift source for going straight upwards is found. The first and second lift sources and the impetus source generated by the present application make a significant improvement on the impetus and lift of the helicopter.

In conclusion, the conventional powerplant would lead fluid pressure from the exterior to itself and have to spend about 90% of impetus to overcome the fluid resistance; while the present application may obtain impetus source from the fluid resistance and lead the fluid pressure to the exterior.

The impetus source of the present application may be obtained by: the inside-out pressure difference generated between the inner and outer fluid channels communicated with the exterior and arranged at the top of the aircraft and/or within the shell of the top of the wing due to different velocities.

The second lift source of the present application may be obtained by: the pressure difference produced by fluid continuity between the high-speed fluid layer formed at the top of the shell and/or the top of the wing of the aircraft and the lower shell in which the fluid flows in a natural state.

The impetus source of the aircraft in the present application may come from: the pressure difference generated between the positive and negative pressure at the front and back of the shell or at the top and bottom of the shell of the aircraft.

The present application may profoundly influence the future development of the moving devices including the aircrafts.

The above-mentioned description represents merely the preferred embodiments of the present disclosure, without any intention to limit the scope of the present disclosure thereto. Various equivalent changes, alternations, or modifications based on the claims of present disclosure are all consequently viewed as being embraced by the scope of the present disclosure.

What is claimed is:

1. A warhead, comprising a cartridge case, wherein an outer fluid channel and an inner fluid channel are arranged successively within a region between a maximum cross section of the warhead and a front portion of the warhead,
    wherein the outer fluid channel is a channel closer to the outer surface of the cartridge case, the inner fluid channel is a channel inside the outer fluid channel;
    wherein the outer fluid channel and the inner fluid channel communicate with the exterior through their own air vents respectively, a convex and concave spoiler surface is arranged on a wall surface within the outer fluid channel, and an area of the air vents of the inner fluid channel is smaller than an area of the air vents of the outer fluid channel.

* * * * *